United States Patent [19]

Kothari et al.

[11] 3,915,891

[45] Oct. 28, 1975

[54] HYDROGENATION CATALYST

[75] Inventors: Vipin M. Kothari, Akron; James J. Tazuma, Stow, both of Ohio

[73] Assignee: The Goodyear Tire & Rubber Company, Akron, Ohio

[22] Filed: Mar. 27, 1974

[21] Appl. No.: 455,422

Related U.S. Application Data

[62] Division of Ser. No. 250,801, May 5, 1972, Pat. No. 3,819,734.

[52] U.S. Cl. .............................. 252/430; 252/431 C

[51] Int. Cl.[2] .............................. B01J 31/04

[58] Field of Search .... 260/666 A, 677 H; 252/430, 252/431 C

[56] References Cited

UNITED STATES PATENTS

| | | | |
|---|---|---|---|
| 1,746,781 | 2/1930 | Lazier | 252/431 C X |
| 1,998,470 | 4/1935 | Taylor | 252/431 C X |
| 2,084,687 | 6/1937 | Jespersen | 252/431 C |
| 3,102,899 | 9/1963 | Cannell | 252/431 C X |
| 3,755,490 | 8/1973 | Yoo et al. | 252/430 X |

*Primary Examiner*—Patrick P. Garvin
*Attorney, Agent, or Firm*—F. W. Brunner; R. A. Thompson; J. Y. Clowney

[57] ABSTRACT

According to the invention there is provided a highly activated process for the hydrogenation of cyclopentadiene to cyclopentene by bringing the cyclopentadiene into contact with a catalyst comprising (1) nickel on a metal oxalate, said metal being selected from the groups consisting of magnesium and zinc, (2) at least one ligand selected from the group consisting of phosphines and phosphites while in the presence of hydrogen at temperatures from about 0°C. to about 200°C. and hydrogen pressure ranging from about 0 to about 10,000 pounds per square inch gauge (psig).

1 Claim, No Drawings

HYDROGENATION CATALYST

This is a division, of application Ser. No. 250,801 filed May 5, 1972, now U.S. Pat. No. 3,819,734, issued June 25, 1974.

This invention is directed to a method of hydrogenation of hydrocarbons.

It is also directed to the discovery of a highly active hydrogenation catalyst. More specifically, this invention relates to a catalyst and a process useful for the selective hydrogenation of cyclopentadiene to cyclopentene.

The selective hydrogenation of unsaturated hydrocarbons to monoolefins and paraffin with a supported catalyst is well known in the prior art. The hydrogenation of unsaturated hydrocarbons with mixed oxalates and formates, i.e. nickel and magnesium or zinc oxalates (or formates) has also been reported.

In this invention, however, the active nickel/magnesium-oxalate catalyst is prepared and used with a ligand. This catalyst when used with the added ligand results in an activated catalyst which is far more active than the previously reported catalysts without any ligands.

Therefore, according to the invention there is provided a highly activated process for the hydrogenation of cyclopentadiene to cyclopentene by bringing the cyclopentadiene into contact with a catalyst comprising (1) nickel, on a metal oxalate, said metal being selected from the groups consisting of magnesium and zinc and (2) at least one ligand selected from the group consisting of phosphines and phosphites, while in the presence of hydrogen, at temperatures from about 0°C. to about 200°C. and hydrogen pressure ranging from about 0 to about 10,000 pounds per square inch gauge (psig).

The component of this invention which comprises the nickel on metal oxalate is comprised of nickel oxalates decomposed on supports such as magnesium and zinc oxalates. This useful component is obtained by preparing a mixed nickel oxalate/magnesium or zinc oxalate and reductively decomposing the nickel oxalate so that the nickel metal is deposited on the magnesium or zinc oxalate. A typical but not limiting method of reductively decomposing the mixed nickel oxalate/magnesium or zinc oxalate is by heating the mixture in a hydrogen atmosphere at about 200°C. to about 350°C. from about 1 to about 4 hours. The nickel/magnesium or zinc oxalate formed upon decomposition is a black pyrophoric powder and contains magnesium or zinc oxalate which functions as a support.

The catalyst formation may be illustrated by the following equation:

$$xNiC_2O_4/xMgC_2O_4.xH_2O + xH_2 \xrightarrow{\Delta} xNi/xMgC_2O_4 + xCO\uparrow + xCO_2\uparrow + xH_2O\uparrow$$

The mixed nickel/magnesium or zinc oxalate was prepared by mixing and stirring together aqueous solutions of nickel salts, magnesium or zinc salts and oxalic acid. The amounts of the reactants may be varied to give different percentages of nickel and magnesium or zinc in the mixture.

The mole ratio of nickel oxalate/magnesium or zinc oxalate can range from about 0.1/1 to about 9/1. The preferred mole ratio is from about 0.25/1 to about 1.5/1.

The preferred range of the nickel metal is therefore from about 20 to about 60 mole percent by weight of the catalyst. Specific amounts of the salts and concentrations cannot be set forth since factors such as purity, different starting salts which may be utilized and the desired percent of each ingredient may be varied.

The combined use of the catalyst and the ligand in this invention, gives the high selectivity to the desired product.

The molar ratio of the ligand/Ni that can be used in this invention can range from about 1/1 to about 5/1 based on the amount of nickel in the reductively decomposed catalyst. The preferred molar ratio is from about 1.5/1 to about 2.5/1.

The component of the catalyst used in this invention which greatly enhances the overall activity of the catalytic system and helps to make a new type of catalyst are compounds which contain an atom or radical which is capable of lending or sharing elections with the nickel metal used in this invention. Such compounds may be called "ligands". "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed.

Compounds which are capable of functioning as useful ligands in this invention are phosphines and phosphites.

The phosphine subclass can be defined by the formula

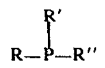

where R, R′ and R″ may represent alkyl, cycloalkyl, aryl, alkaryl and arylalkyl radicals containing from about 1 to about 10 carbon atoms; R, R′ and R″ may be the same or dissimilar. These phosphines represent a class of compounds which have three carbon atoms attached by single bonds to phosphorus atom. Representative but not exhaustive of the phosphines useful as ligands in this invention are trimethyl, tributyl phosphines or triphenyl phosphine, methyl diethyl phosphine, methyl ethyl propyl phosphine or methyl ethyl phenyl phosphine and the like.

The phosphite subclass can be defined by the formula

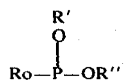

where R, R′ and R″ represent alkyl, cycloalkyl, aryl, alkaryl, and arylalkyl radicals containing from about 1 to about 10 carbon atoms; R, R′ and R″ may be the same or dissimilar. These phosphites represent a class of compounds which have three carbon atoms attached to three oxygen atoms by single bonds and the oxygen atoms attached by single bonds to a phosphorus atom. Representative but not exhaustive of the phosphites useful as ligands in this invention are trimethyl phosphite, triethyl phosphite, tributyl phosphite, triphenyl phosphite, methyl, ethyl, propyl, phosphite, methyl, ethyl, phenyl, phosphite and dimethyl, phenyl phosphite.

Although the hydrogenation examples were carried out batchwise in these examples, it should be understood that the hydrogenation reaction may be carried out continuously over a fixed bed or in a fluid bed. The hydrogenation may be carried out with or without a solvent. If a solvent is used it should be one that will not undergo reduction.

The temperature range used for the hydrogenation reaction may be from about 0°C. to about 200°C. The preferred range is from about 20°C. to about 100°C. The pressure under which the hydrogenation reaction may be conducted can be from about zero pounds square inch gauge (psig) to about 10,000 pounds square inch gauge (psig). However, it may be advantageous to conduct the hydrogenation in the range of atmospheric pressure to about 1000 pounds per square inch gauge (psig.)

Further practice of this invention is illustrated by reference to the following examples which are intended to be illustrative and in no manner limiting.

EXAMPLE I

The cyclopentadiene (10 grams) was mixed with 40–50 milliliters of ethanol in a 500 milliliter Parr hydrogenation bottle. One tenth (0.1) gram of Nickel/-Magnesium oxalate and 0.86 gram tributyl phosphite, $(BuO)_3P$, were added to the ethanol solution. The bottle is then closed and allowed to rock and heat at 135°F. in the hydrogenation equipment under hydrogen pressure of 55–60 pounds per square inch gauge (psig) until a desired drop in the hydrogen pressure is achieved. The time for reaction was 40–45 minutes. When all of the cyclopentadiene was hydrogenated with 90 percent going to cyclopentene and 10 percent going to cyclopentane.

Table 1

| Run | CPD[1] (gms) | CPD Ni/Mg-ox.[2] Weight Ratio | Solvent | Ligand[3] | Time Min. | Temp. °F. | Conv. of CPD To Products | Products |
|---|---|---|---|---|---|---|---|---|
| 1 | 10 | 100 | EtOH | $(BuO)_3P$ .86 gm. | 40–45 | 135 | 100 | (90% CPE[4] (10% CPA[5] |
| 5 | 10 | 100 | EtOH | $(Ph)_3P$ .89 gm. | 120 | 135 | 98.4 | (88% CPE (12% CPA |
| 6 | 10 | 100 | 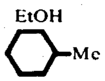 | $(Ph)_3P$ .89 gm. | 130 | 135 | 100 | (85% CPE (15% CPA |

[1]-CPD = Cyclopentadiene
[2]-ox. = Oxalate
[3]-Ligand/Nickel = 2/1 (molar ratio)
[4]-CPE = Cyclopentene
[5]-CPA = Cyclopentane

EXAMPLE II

This example is the same as Example I except that the ligand was not used. It can be noted that the conversion of the hydrocarbon is much lower than with the ligand.

Table 2

| Run | CPD[(1)] (gms) | CPD Ni/Mg-ox[(2)] Weight Ratio | Solvent | of CPD Time (min.) | Temp. °F | Conv. Pro- to Products | ducts % |
|---|---|---|---|---|---|---|---|
| 1 | 10 | 100 | EtOH | 120 | 125 | 4 | 100%CPE* |
| 2 | 10 | 50 | EtOH | 120 | 130 | 20 | 100%CPE |
| 3 | 10 | 15 | EtOH | 120 | 135 | 40 | 100%CPE |

[(1)]-CPD = Cyclopentadiene.
[(2)]-ox. = oxalate.
(*)-CPE = Cyclopentene.

While certain representative embodiments and details have been shown for the purpose of illustrating the invention, it will be apparent to those skilled in this art that various changes and modifications may be made therein without departing from the spirit or scope of the invention.

What is claimed is:

1. A catalyst composition consisting essentially of (1) nickel on a metal oxalate, said metal being selected from the group consisting of magnesium and zinc, and (2) at least one ligand selected from the group consisting of phosphines and phosphites wherein said phosphine is defined by the formula

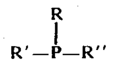

where R, R' and R'' represents alkyl, cycloalkyl, aryl, alkaryl or arylalkyl radicals containing from about 1 to about 10 carbon atoms and wherein said R, R' and R'' may be the same or dissimilar; and wherein said phosphites can be defined by the formula

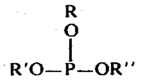

wherein R, R' and R'' represent alkyl, cycloalkyl, aryl, alkaryl or arylalkyl radicals containing from about 1 to about 10 carbon atoms, and wherein R, R' and R'' may be the same or dissimilar and wherein the nickel ranges from about 20 mole percent to about 60 mole percent by weight of the component (1) of the catalyst and the molar ratio of the ligand of component (2)/nickel of component (1) ranges from about 1.5/1 to about 2.5/1.

* * * * *

UNITED STATES PATENT OFFICE
CERTIFICATE OF CORRECTION

PATENT NO. : 3,915,891
DATED : October 28, 1975
INVENTOR(S) : Vipin M. Kothari and James J. Tazuma It is certified that error appears in the above-identified patent and that said Letters Patent are hereby corrected as shown below:

Column 2, line 50, the formula should read as follows:

R'
O
|
RO - P - OR"

Column 3, Table 2, the table headings are mixed up and should read as follows:

| Run | CPD(1) (gms) | CPD Ni/Mg-ox(2) Weight Ratio | Sol-vent | Time Min. | Temp °F. | Conv. of CPD to Pro-ducts | Pro-ducts % |
|---|---|---|---|---|---|---|---|

Signed and Sealed this

Twelfth Day of October 1976

[SEAL]

*Attest:*

RUTH C. MASON
*Attesting Officer*

C. MARSHALL DANN
*Commissioner of Patents and Trademarks*